Feb. 2, 1954 — M. E. SNODDY — 2,668,078
UNDERGROUND SPRINKLER SYSTEM
Filed Sept. 1, 1950 — 2 Sheets-Sheet 1
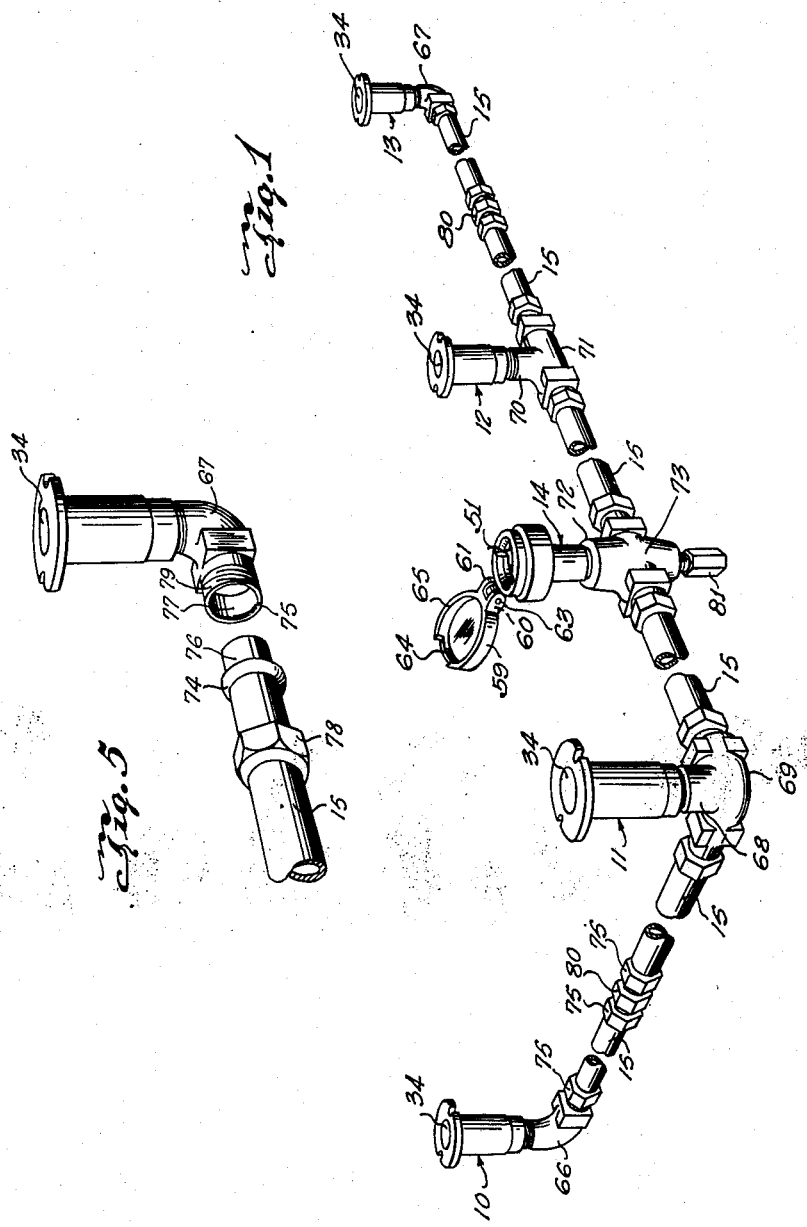
Max E. Snoddy
INVENTOR.
ATTORNEY Feb. 2, 1954  M. E. SNODDY  2,668,078
UNDERGROUND SPRINKLER SYSTEM
Filed Sept. 1, 1950  2 Sheets-Sheet 2
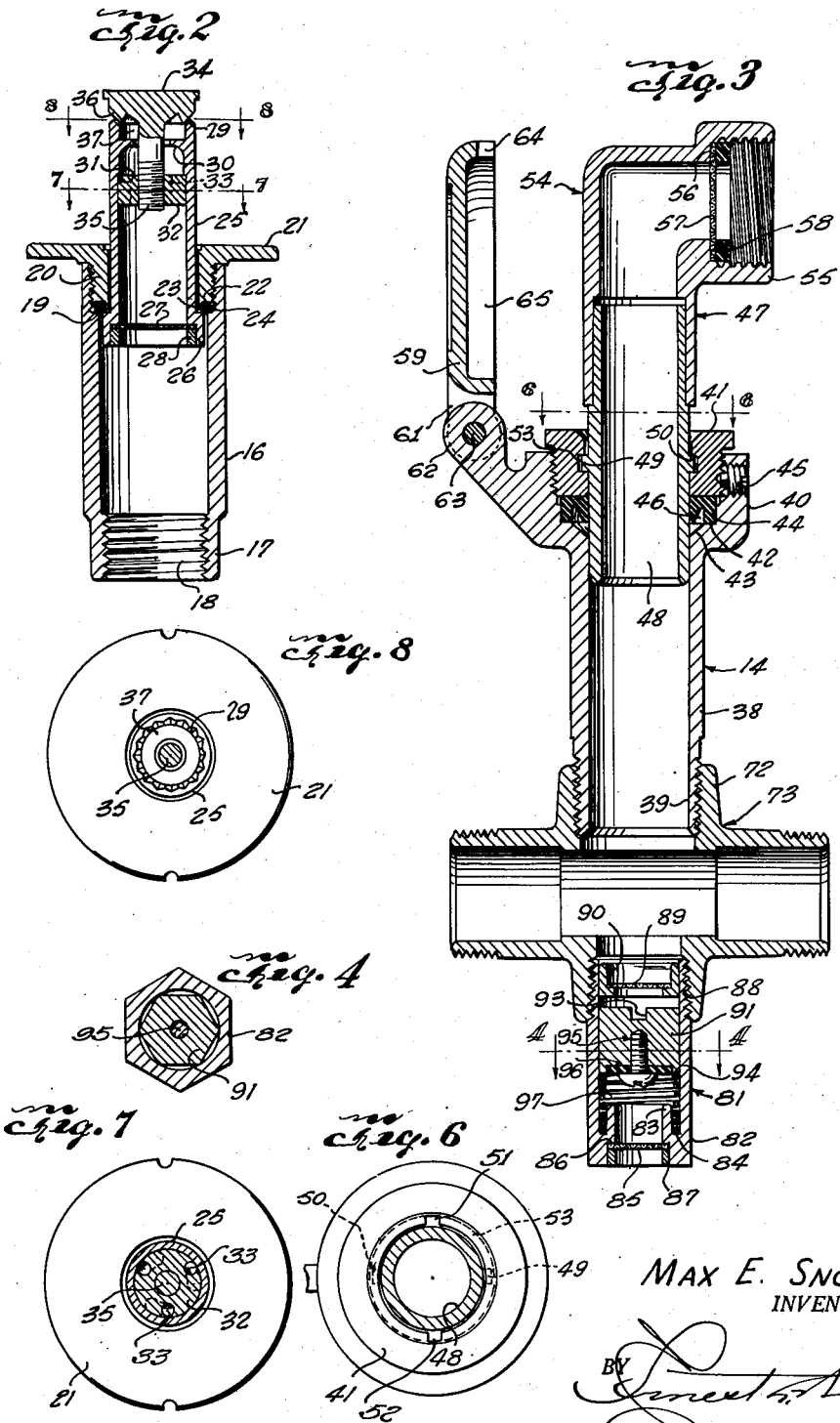
MAX E. SNODDY
INVENTOR.
ATTORNEY

Patented Feb. 2, 1954

2,668,078

UNITED STATES PATENT OFFICE 2,668,078

UNDERGROUND SPRINKLER SYSTEM

Max E. Snoddy, Dallas, Tex.

Application September 1, 1950, Serial No. 182,705

2 Claims. (Cl. 299—60)

This invention relates to sprinkling systems and more particularly to sprinkling systems for watering lawns.

Sprinkling systems of the underground type are often employed to water lawns. They employ a plurality of spaced sprinklers or spray heads connected to a common supply of water under pressure. It is desirable that a maximum area of lawn be sprinkled by each sprinkler or spray head but the rate of supply of water from the source is often limited especially in small home installations. It is desirable, therefore, that the sprinkler or spray head cast a spray of water over a maximum area even though the rate of supply of water be small. Moreover, the components of the sprinkling system should be easily and quickly assembled to form a network which will water an area of any shape. The system should be provided with a connector which can be easily connected to a hose to supply water to the system. Lastly, the system should be provided with an automatic drain which will empty the system of water after each operation to prevent damage to the system by the formation of ice within the components of the system.

Accordingly it is an object of my invention to provide a new and improved lawn sprinkling system.

It is another object of my invention to provide a new and improved lawn sprinkling system whose component parts are easily assembled to water an area of any shape.

It is another object of my invention to provide a new and improved water sprinkling system which will water a maximum area when connected to a source of water providing a limited rate of supply of water.

It is another object of my invention to provide a new and improved spray head.

It is another object of my invention to provide a new and improved spray head which will water a maximum area when connected to a source of water providing a limited rate of supply of water.

It is another object of my invention to provide a new and improved hose connector for sprinkling systems.

It is still another object of my invention to provide a new and improved automatic drain valve.

Briefly stated, my new and improved sprinkling system comprises a plurality of spray heads connected by means of piping which are connected to a common supply of water through a hose connector. Each of the spray heads is normally positioned flush with the surface of the ground but moves to a raised position when the system is connected to a source of water under pressure. Each of the spray heads has a nozzle member having a serrated upper edge which cooperates with a cover member to cast a fine spray of water over a maximum area while allowing only a limited quantity of water to escape through the nozzle member. The hose connector comprises a coupling member which is insertable in an upstanding body which is provided with a cover which is disposed flush with the surface of the ground when the sprinkling system is not in operation. The sprinkling system is also provided with a spring biased drain valve which is closed when the system is connected to a source of water under pressure and which is opened by a spring to drain the water in the system when the system is disconnected from the source of water.

For a better understanding of my invention, reference may be had to the following description taken in connection with the accompanying drawing and its scope will be pointed out in the appended claims.

Figure 1 is a perspective view, with some parts broken away, of a lawn sprinkling system embodying my invention;

Figure 2 is a sectional view of one of the sprinkler heads shown in Figure 1;

Figure 3 is a sectional view of the hose connector and drain valve of the system shown in Figure 1;

Figure 4 is a sectional view taken along line 4—4 of Figure 3;

Figure 5 is a fragmentary exploded view showing the manner in which the piping is connected to various components of the system;

Figure 6 is a sectional view, taken along line 6—6 of Figure 3;

Figure 7 is a view of one of the parts of the spray head shown in Figure 2; and

Figure 8 is a top plan view of one of the parts of the spray head shown in Figure 2.

Referring now to the drawing, the illustrated embodiment of my invention comprises four spray heads 10, 11, 12 and 13 connected to each other and to a hose connector receiving assembly 14 by means of sections 15 of piping and appropriate fittings which will be described below.

Each of the spray heads comprises a hollow body member 16 having a reduced lower end 17 interiorly threaded as at 18. The upper part of body member is provided with a ledge 19 and is interiorly threaded to engage an exteriorly threaded sleeve 20 which is provided with an outwardly extending flange 21. The lower end of sleeve 20 is reduced to form a ledge 22 extending outwardly from an annular depending lip 23. A washer 24 which may be of rubber or other resilient substance is disposed between ledges 19 and 22 and abuts lip 23. Lip 23 is employed to prevent contact between the inner surface of washer 24 and outer surface of the slidable nozzle member 25 which is slidably disposed in body member 16 and sleeve 20.

Nozzle member 25 has an enlarged lower end 26 in which is disposed a screen 27 held in place in end 26 by a ring 28 which is press fitted in end 26. The upper end of nozzle member 25 has an upwardly and outwardly inclined surface in which is provided serrations 29. Nozzle member 25 is also provided with inwardly extending flanges 30 and 31. A core 32 having a threaded central aperture and a plurality of spiral apertures 33 abuts flange 31 which limits the upward movement of core 32. A cover member 34 is provided with threaded rod 35 which extends through the restricted aperture formed by flange 30 and engages in the threaded central aperture in core 32. The cover member 34 is provided with an upwardly and outwardly extending annular surface 36 which abuts the serrations 29 of nozzle member 25. The annular surface 36 is wider than the serrations 29 and therefore extends outwardly beyond serrations 29. The serrations restrict the total open area between cover 34 and the upper end of nozzle member 25 to restrict the flow of water. Since serrations 29 restrict the flow of water, the sprinkling system may be employed satisfactorily even when connected to a supply of water under relatively low pressure. At the same time, the relatively small apertures formed by serrations 29 and surface 36 cause the jets of water to be cast outwardly over a relatively large area.

When water is supplied to each spray head 10, 11, 12 and 13, the pressure of the water causes the nozzle members 25 to move slidably from the lower positions illustrated in Figures 1 and 5 to the raised position illustrated in Figure 2. The water passes through screen 27 and then through spiral apertures 33 which agitate the water. The agitated water then passes through the annular orifice between flange 30 and rod 35 into the mixing chamber 37 from whence it is expelled through the apertures formed by serrations 29 and surface 36. The agitation of the water in passing through the spiral apertures 33 into the mixing chamber 37 causes a fine spray to be produced as well as the jets of water. The spray and the jets of water meet or blend as they pass under surface 36 beyond serrations 19 to form a continuous sheet of spray to provide an even distribution of water over the surrounding area of grass.

The hose connector receiving assembly 14 comprises a body member 38 having an exteriorly threaded lower end 39 and an enlarged upper end 40 which is interiorly threaded to engage an exteriorly threaded collar 41. The enlarged upper end forms a ledge 42 from which extends downwardly and inwardly a surface 43. An annular seal 44 of rubber or other resilient substance is disposed between collar 41 and ledge 42 and is maintained in position by collar 41. A set screw 45 positioned in a suitable threaded aperture is employed to lock collar 41 in place. Seal 44 is provided with an annular groove 46 which opens on the surface 43.

The hose connector 47 comprises a bushing 48 having a lower portion adapted to extend through collar 41 and body member 38 past seal 44. Seal 44 prevents the passage of water between bushing 48 and a body member 38. Any water passing between bushing 48 and body member 38 will flow into groove 46 to press seal 44 more closely against bushing 48. Bushing 48 is provided with a pair of oppositely disposed ears or keys 49 and 50 which extend outwardly and are adapted to pass through slots 51 and 52, in collar 41 into an annular recess or groove 53 in collar 41. After bushing 48 is inserted through collar 41 into body 38 with ears 49 and 50 passing through slots 51 and 52, the bushing is rotated to move ears 49 and 50 into groove 53 beyond slots 51 and 52 and lock bushing 48 to body member 38.

The upper end of bushing 48 is press fitted into a coupler 54 which has an enlarged end 55 which is internally threaded to engage the exteriorly threaded fitting of a hose, not shown. The enlarged end 55 has a ledge 56 against which abuts a screen 57 which may be held in place by a ring 58 of rubber or other resilient material which will seal the joint between the hose fitting, not shown, and coupler 54 against the leakage of water.

A cover 59 has a pair of spaced ears 60 and 61 which are pivotally connected to an outwardly extending lug 62 by maens of a pin 63. Cover 59 is adapted to fit over collar 41 and enlarged end 40 when hose connector is not disposed in hose connecting assembly 14. A slot 64 may be provided in the flange 65 of cover 59 to enable the cover 59 to be easily grasped.

The body member 16 of spray heads 10 and 13 may be connected by means of the threads 18 to elbow fittings 66 and 67, respectively, the body member 16 of spray head 11 may be connected to the side outlet 68 of side outlet elbow 69, and the body member 16 of spray head 12 may be connected to the outlet 70 of T fitting 71. The body member 38 may be connected to the interiorly threaded inlet 72 of a cross fitting 73. The fittings 66, 67, 69 and 73 may be connected together by means of sections 15 of piping. Each of the sections 15 is provided adjacent each end with a beveled compression ring 74 which is adapted to press against the rounded nose 75 of a fitting, such as fitting 67, when its adjacent end 76 is inserted into the counterbore 77 of the fitting. An interiorly threaded tube nut 78 engages the exteriorly threaded counterbored end 79 of the fitting to compress the ring 74 against the rounded nose 75 of the fitting to make a watertight seal between the fitting and the section 15. As many sections 15 as desired may be employed to properly space spray heads 10, 11, 12 and 13 by using couplings 80 between a pair of sections 15. The couplings 80 have their opposite ends exteriorly threaded to engage the tube nuts 78 of sections 15 which they couple.

While the sprinkling system illustrated is L-shaped to cover an L-shaped lawn, it will be obvious that by use of appropriate fittings the sprinkling system may be adapted to cover lawns of different shape. For example, by using a T fitting such as fitting 71 in place of fitting 69, the spray heads 10 to 13 will be disposed in a straight line and will cover a rectangular lawn with spray.

In order to drain the sprinkling system of water after each operation of the system, I provide a drain valve 81 comprising a body member 82 having a valve seat 83 disposed within the member 82 and spaced from the inner surface thereof to form an annular recess 84. A screen 85 is disposed adjacent the lower end of member 82 and is held between an annular ledge 86 and a ring 87 press fitted into member 82. The upper exteriorly threaded end 88 is also provided with a screen 89 which is secured to a ring 90 by soldering or other conventional means. The ring 90 is press fitted into the upper end 88. Slidably disposed between valve seat 83 and ring 90 is a polygonal plunger 91 whose upper end is provided with at least one slot 93 and whose lower end is provided with an outer, downwardly depending annular flange 94 which forms a recess in which is secured, by means of a screw 95, a washer 96 of rubber or other resilient material. Washer 96 cooperates with valve seat 83 to close the drain valve 81 when water under pressure is applied to the sprinkler system. A spring 97 having its lower portion in recess 84 and its upper portion bearing against flange 94 is provided to bias plunger 91 to its upper position.

The drain valve 81 is attached to cross fitting 73 by means of its threaded upper end 88 which engages a downwardly extending interiorly threaded outlet of fitting 73. When water under pressure is supplied to the sprinkling system through hose connector 47, the pressure of the water moves plunger 91 downwardly against the force exerted by spring 97 and washer 96 is pressed against valve seat 83 to close the drain valve 81. If the supply of water is removed, spring 97 moves plunger 91 upwardly. The water in fitting 73 will then flow through screen 89, through the openings between the outer surfaces of polygonal plunger 91 and the cylindrical inner surface of member 82, and through screen 85. In this manner the water is drained from the sprinkling system. Slot 93 is provided to insure that the water will drain off even if the spring 97 moves plunger 91 to such a height that its upper surface engages the ring 90. If slot 93 were not provided, the upper surface of plunger 91 would engage ring 90 about its whole lower surface and would prevent the passage of water into the spaces between plunger 91 and the inner surface of member 82. Slot 93 will allow the passage of water into the spaces between plunger 91 and the inner surface of member 82 even when the upper surface of plunger 91 engages ring 90.

Since the sprinkling system is subjected to moisture, all components of the system are made of brass, bronze or other corrosion resisting substance wherever practicable.

While I have illustrated and described preferred embodiments of my invention, it will be obvious that various changes and modifications can be made without departing from my invention and I, therefore, aim in the appended claims to cover all such changes and modifications as fall within the true spirit and scope of my invention.

What is claimed is:

1. In an underground sprinkling system composed of a plurality of spray heads connected to a common water conduit and normally not protruding over the surface of the ground; a water inlet means comprising a tubular body having an enlarged and interiorly threaded upper end and connected at its lower end to said common water conduit, said inlet means normally not protruding over the surface of the ground; a collar receivable in the threaded upper end of said body having a bore provided with an axial bore and diametrically opposed slots communicating with said groove, a tubular hose connector having diametrically opposed ears, said hose connector being adapted to engage in telescoping relation in said water inlet means whereby said ears will lockingly engage in said annular groove through said slots, a hose engaging means carried by the upper end of said hose connector, said hose connector communicating with the interior of said common conduit when telescoped in said inlet means; and water sealing means within the threaded upper end of said tubular body and embracing said base connector below said collar.

2. In an underground sprinkling system composed of a plurality of spray heads connected to a common water conduit, a water inlet means therefor comprising a tubular body having a smooth bore and an enlarged and threaded upper end, said inlet means normally not protruding over the surface of the ground, a hose connector comprising a tubular member having one end receivable telescopically in the bore of said water inlet means, a collar in the enlarged end of said water inlet means, interlocking means carried jointly by said collar and said hose connector to hold the latter against longitudinal displacement in said water inlet means and a hose engaging means on the upper end of said hose connector.

MAX E. SNODDY.

References Cited in the file of this patent

UNITED STATES PATENTS

| Number | Name | Date |
|---|---|---|
| 1,192,743 | Brooks | July 25, 1916 |
| 1,259,902 | Parker | Mar. 19, 1918 |
| 1,428,553 | Oakes | Sept. 12, 1922 |
| 1,639,220 | Elder | Aug. 16, 1927 |
| 1,758,119 | Le Moon | May 13, 1930 |
| 1,821,579 | Rader | Sept. 1, 1931 |
| 1,853,411 | Gentry et al. | Apr. 12, 1932 |
| 2,126,857 | Yancey | Aug. 16, 1938 |
| 2,136,898 | Thomas | Nov. 15, 1938 |
| 2,233,818 | Matter | Mar. 4, 1941 |
| 2,268,855 | Brooks | Jan. 6, 1942 |
| 2,278,976 | Crume | Apr. 7, 1942 |
| 2,434,767 | Hertel | Jan. 20, 1948 |
| 2,469,505 | Keefer | May 10, 1949 |
| 2,531,101 | Becker | Nov. 21, 1950 |